Jan. 14, 1958   W. B. SKEEM   2,819,665
TRACTOR IMPLEMENT LINKAGE OR HOOK-UP
Filed March 15, 1954
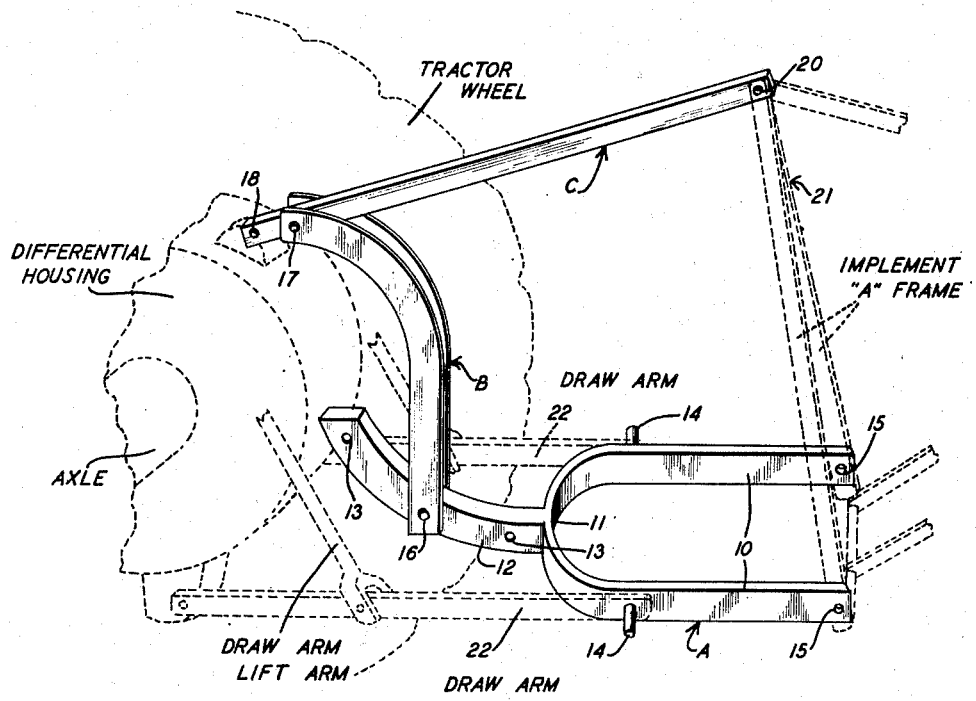
INVENTOR
WAYNE B. SKEEM
BY *John A. Mawhinney*
ATTORNEY

United States Patent Office 2,819,665
Patented Jan. 14, 1958

2,819,665
TRACTOR IMPLEMENT LINKAGE OR HOOK-UP

Wayne B. Skeem, Buhl, Idaho

Application March 15, 1954, Serial No. 416,009

2 Claims. (Cl. 97—47.5)

The present invention relates to an implement raising hitch primarily adapted for connecting an implement to a tractor.

One of the objects of the present invention is to provide an implement raising hitch which is inexpensive to manufacture and easy to operate.

A further object is to provide an implement raising hitch device adapted to raise the implement an additional foot or so off the ground, and to lower the implement when desired.

Another object is to provide an implement hitch for connecting an implement to a tractor comprising, a three arm portion with two of said arms extending substantially in the same horizontal plane, the other of said arms being curved and terminating at a point above the position of horizontal extension of said other two arms of said three armed portion when said other two arms are positioned in a horizontal plane, said curved arm having a plurality of spaced apart apertures therein, said other two arms each being apertured in the free end portion thereof and being adapted for removable attachment to an implement, a pivot pin carried by each of said two horizontal arms on a side portion thereof remote from the free end potrion, a curved link arm adapted to be secured at one end thereof to said curved arm of said three armed portion, a tie rod, said curved link arm extending upwardly and being adapted to be connected at the other end thereof to one end of said tie rod, said tie rod being adapted at its other end to be connected to an implement, whereby said tie rod may be positioned at a greater height from the ground than said three armed portion.

Another object of the present invention is an implement hitch for connecting an implement to a tractor comprising, a three arm portion with two of said arms extending substantially in the same horizontal plane, the other of said arms being curved and terminating in a different horizontal plane from said other two arms of said three armed portion when said other two arms are positioned in a horizontal plane, a curved link arm adapted to be secured at one end thereof to said curved arm of said three armed portion, a tie rod, said curved link arm extended upwardly and being adapted to be connected at the other end thereof to one end of said tie rod, said tie rod being adapted at its other end to be connected to an implement, whereby said tie rod may be positioned at a greater height from the ground than said three armed portion.

Other and further objects of the present invention will be apparent from the following description thereof.

In the drawing where like numerals refer to like or corresponding parts throughout the several views, the drawing shown represents a composite view of the three parts of the implement hitch which embodies the features of the present invention.

In the drawing, A generally indicates the yoke portion of the implement raising hitch, B a curved link arm and C top linkage in the form of a tie rod. The yoke portion A comprises a substantially U-shaped part having arms 10 and a closed point 11 and an additional arm 12 extends axially from the point 11. The arm 12 curves upwardly and terminates at a point above the horizontal plane of the arms 10 and has formed therein a series of spaced apart apertures 13. Adjacent the point 11, the arms 10 have pivot pins 14 extending from the outer faces thereof and the free end portions of the arms 10 have apertures 15 formed therethrough.

The link arm B is pivotally connected adjacent its lower end as at 16 to the arm 12 selectively at one of the apertures 13 and extends upwardly and forwardly therefrom and is pivotally connected as at 17 to the forward end portion of the tie rod C. At its forward end the tie rod C is pivotally connected as at 18 to the differential housing 19 of a conventional tractor and at its rear end the tie rod is pivotally connected as at 20 to the apex of an implement A frame, generally indicated at 21. The pins on the lower end portions of the legs of the implement A frame are pivotally received by the apertures 15 in the arms 10.

The rear free end portions of the tractor draw arms 22 have openings which engage over the pins 14 on the arms 10.

In function, the tractor draw arms lift at points 14. The point 16 of the yoke remains relatively stable, serving as a fulcrum and as a result, the implement 21 attached at 15 and 20 is "jackknifed" into a position fourteen inches higher than if it were hooked directly into the tractor draw arms. Embellishments, such as a turnbuckle placed in the top linkage C for adjustment purposes, or a latched hole at point 15 for easy hook-up to implement, could be had, but have no relative importance upon the basic function of the yoke adapter.

This yoke adapter will facilitate raising an implement an additional fourteen inches off the ground, and will operate to a similar advantage conversely. This extended working range is extremely valuable when using certain implements under varying conditions. For example, a 3-point hang-on ditcher will not normally clear the ground more than two or three inches when in raised position. This makes it extremely difficult, and many times impossible, to maneuver a tractor astride an irrigation ditch for working purposes. By simply incorporating the use of this yoke adapter, however, ample clearance is gained, maneuverability is again a reality, the ditcher will reach the bottom of even a high-banked ditch, and the functional use of the implement is not impaired.

A similarly improved effect is had upon other implements which characteristically are slung low, and interfere in carry or transport position.

One of the primary advantages of the present invention is its simplicity of structure and design and its adaptability for connection with any farm tractor or implement using a 3-point hook-up. Because of the particular structure of the link pieces, the implement can be raised or lowered with reference to the tractor depending upon the particular use to which the implement is being put.

Various modifications may be made of the present invention without departing from the scope thereof and it is therefore desired to be limited only by the scope of the appended claims.

What is claimed is:

1. An implement raising hitch for connecting an implement to a tractor comprising, a substantially U-shaped portion having a point and having an additional arm extending axially from the point of the U away from the mouth thereof, said additional arm being curved and terminating at a point above the position of horizontal extension of the arms of said U-shaped portion when said arms are positioned in a horizontal plane, said curved arm having a plurality of spaced apart apertures therein, said U-shaped portion being apertured in the outer arm portions thereof and being adapted for removable attachment to an implement, a pivot pin carried on the exterior of one of said arms of said U-shaped portion near the closed portion of the U for connection to the tractor, a second pivot pin exteriorly carried by the other of said arms of the U-shaped portion near the closed portion of the U for connection to the tractor, a curved link arm adapted to be secured at one end thereof to said additional arm of said U-shaped portion adjacent said point, a tie rod, said curved link arm extending upwardly and being adapted to be connected at the other end thereof to one end of said tie rod, said tie rod being adapted at its other end to be connected to an implement, whereby said tie rod may be positioned at a greater height from the ground than said U-shaped portion, and means on said tie rod for connecting it to the tractor, said curved link arm constituting means to hold said point of the U-shaped portion in a relatively immovable position when the apertured outer arm portions of the U-shaped portion and the said other end of the tie rod are raised to elevate the implement.

2. An implement hitch for connecting an implement to a tractor comprising, a three armed portion having a fixed fulcrum point with two of said arms extending substantially in the same horizontal plane, the other of said arms being curved and terminating at a point above the position of horizontal extension of said other two arms of said three armed portion when said other two arms are positioned in a horizontal plane, said curved arm having a plurality of spaced apart apertures therein, said other two arms each being apertured in the free end portion thereof and being adapted for removable attachment to an implement, a pivot pin carried by each of said two horizontal arms on a side portion thereof remote from the free end portion for connection to the tractor, a curved link arm adapted to be secured at one end thereof to said curved arm of said three armed portion, a tie rod, said curved link arm extending upwardly and being adapted to be connected at the other end thereof to one end of said tie rod, said tie rod being adapted at its other end to be connected to an implement, whereby said tie rod may be positioned at a greater height from the ground than said three armed portion, and means on said tie rod for connecting it to the tractor, said curved link arm constituting means to hold said fulcrum point in a relatively immovable position when the apertured free end portions of the three armed portion are swung upwardly about said fulcrum point to cause the implement to be jackknifed into an elevated position.

References Cited in the file of this patent

UNITED STATES PATENTS

| | | |
|---|---|---|
| 2,311,671 | Larsen | Feb. 23, 1943 |
| 2,346,757 | Horner | Apr. 18, 1944 |
| 2,410,508 | Lamme | Nov. 5, 1946 |
| 2,456,693 | Fraga | Dec. 21, 1948 |
| 2,527,613 | Zagurski | Oct. 31, 1950 |
| 2,557,637 | Danuser | June 19, 1951 |
| 2,591,662 | Struthers et al. | Apr. 1, 1952 |
| 2,624,551 | Garner | Jan. 6, 1953 |